US008284882B2

(12) United States Patent
Kleese et al.

(10) Patent No.: US 8,284,882 B2
(45) Date of Patent: Oct. 9, 2012

(54) METHODS AND APPARATUS FOR QUALIFICATION OF UPDATE OF CLOCK RECOVERY AND EQUALIZATION

(75) Inventors: Gregory A. Kleese, Northfield, MN (US); Mohammad S. Mobin, Orefield, PA (US); Kenneth W. Paist, Spring City, PA (US)

(73) Assignee: LSI Corporation, Milpitas, CA (US)

( * ) Notice: Subject to any disclaimer, the term of this patent is extended or adjusted under 35 U.S.C. 154(b) by 695 days.

(21) Appl. No.: 12/491,760

(22) Filed: Jun. 25, 2009

(65) Prior Publication Data

US 2010/0329324 A1    Dec. 30, 2010

(51) Int. Cl.
*H04L 7/00*    (2006.01)

(52) U.S. Cl. .......................... 375/354; 375/230; 370/287

(58) Field of Classification Search .................. 375/229, 375/232, 233, 340, 346, 348, 350, 354, 355, 375/371; 370/370, 286, 287, 290, 292; 341/113, 341/121, 122, 125, 145, 156, 157, 158
See application file for complete search history.

(56) References Cited

U.S. PATENT DOCUMENTS

| 6,831,958 | B1 * | 12/2004 | Rouvellou | .................... 375/350 |
| 7,460,630 | B2 * | 12/2008 | Kato et al. | .................... 375/372 |
| 7,492,813 | B2 * | 2/2009 | Agazzi | ........................ 375/220 |

* cited by examiner

*Primary Examiner* — Dac Ha
(74) *Attorney, Agent, or Firm* — Ryan, Mason & Lewis, LLP (57) ABSTRACT

Methods and apparatus are provided for CDR and equalization update qualification. A block of received data comprising a plurality of multiple tone patterns is processed. Equalization adaptation and/or updates to a timing recovery process can be selectively disabled if one or more of the multiple tone patterns exceed a corresponding predefined threshold.

20 Claims, 7 Drawing Sheets

```
for i=MA_WINDOW+10:npts-5
  rl0=0;
  rl1=0;
  rl2=0;
  rl3=0;
  rl4=0;
  for j=i-MA_WINDOW:i
    % bin 1 run length (1 0 1 0 1 0)
    if (dat(j)==~dat(j-1)) & (dat(j-1)==~dat(j-2))
      rl0=rl0+1;
    end
    % bin 2 run length (0 1 1 0 or 1 0 0 1)
    if (dat(j)==~dat(j-1)) & (dat(j-1)==dat(j-2)) & (dat(j-2)==~dat(j-3))
      rl1=rl1+1;
    end
    % bin 3 run length (0 1 1 1 0 or 1 0 0 0 1)
    if (dat(j)==~dat(j-1)) & (dat(j-1)==dat(j-2)) & (dat(j-2)==dat(j-3)) & (dat(j-3)==~dat(j-4))
      rl2=rl2+1;
    end
    % bin 4 run length (0 1 1 1 1 0 or 1 0 0 0 0 1)
    if (dat(j)==~dat(j-1)) & (dat(j-1)==dat(j-2)) & (dat(j-2)==dat(j-3)) & (dat(j-3)==dat(j-4)) & (dat(j-4)==~dat(j-5))
      rl3=rl3+1;
    end
  end
  rl0_bin(i)=rl0;
  rl1_bin(i)=rl1;
  rl2_bin(i)=rl2;
  rl3_bin(i)=rl3;
end
```

METHODS AND APPARATUS FOR QUALIFICATION OF UPDATE OF CLOCK RECOVERY AND EQUALIZATION

FIELD OF THE INVENTION

The present invention relates generally to adaptation techniques for clock recovery and equalization and, more particularly, to methods and apparatus for clock recovery and equalization update qualification.

BACKGROUND OF THE INVENTION

Digital communication receivers must sample an analog waveform and then reliably detect the sampled data. Signals arriving at a receiver are typically corrupted by intersymbol interference (ISI), crosstalk, echo, and other noise. In order to compensate for such channel distortions, communication receivers often employ well-known equalization techniques. For example, zero equalization or decision-feedback equalization (DFE) techniques (or both) are often employed. Such equalization techniques are widely-used for removing intersymbol interference and to improve the noise margin See, for example, R. Gitlin et al., Digital Communication Principles, (Plenum Press, 1992) and E. A. Lee and D. G. Messerschmitt, Digital Communications, (Kluwer Academic Press, 1988), each incorporated by reference herein.

It is often desirable to allow for the equalization components to adaptively respond to changes in channel characteristics or ambient conditions, such as temperature and humidity. Adaptation algorithms typically adapt their filter coefficients in accordance with the signal statistics or the signal spectrum. Equalization algorithms will typically converge on a set of filter coefficients that are often dependent on the channel. In many applications, the data pattern may change suddenly and the converged equalizer coefficients will diverge if the data pattern is not spectrally rich. Thus, a degradation of bit error performance may be experienced.

A receiver typically also includes a clock and data recovery (CDR) system to recover the clock and data from an incoming data stream. The CDR system generates a clock signal having substantially the same frequency and phase as the incoming signal, which is then used to sample the received signal and detect the transmitted data.

Transmitted data may not be sufficiently spectrally rich to provide valid equalization or CDR update results (or both). For example, equalization or CDR updates performed for one frequency, may not be valid for other frequencies. Existing CDR and equalizer adaptation techniques, however, do not detect signal statistics to qualify their updates. Thus, the CDR system can potentially generate jitter due to polarization of high density transitions followed by low density transitions and vise versa. Likewise, equalization updates in the presence of polarized signal transitions can drive equalization coefficients away from their optimal values.

A need therefore exists for methods and apparatus for CDR and equalization update qualification. A further need exists for CDR and equalization adaptation methods and apparatus that can detect pattern statistics, and selectively disable CDR and equalization adaptation in the presence of poor pattern statistics. Yet another aspect of the invention ensures rich tone signals for adapting equalization and timing recovery.

SUMMARY OF THE INVENTION

Generally, methods and apparatus are provided for CDR and equalization update qualification. A block of received data comprising a plurality of multiple tone patterns is processed. According to one aspect of the invention, updates to a timing recovery process can be selectively disabled if one or more of the multiple tone patterns exceed a corresponding predefined threshold. According to another aspect of the invention, equalization adaptation can be selectively disabled if one or more of the multiple tone patterns exceed a corresponding predefined threshold.

The multiple tone patterns can be counted, for example, using a tone pattern matching technique. The multiple tone patterns may be embodied, for example, as a Compliant Jitter Tolerance Test Pattern (CJTPAT), and can comprise, for example, a 1 T run length pattern, a 2 T run length pattern and a 4 T run length pattern. Generally, the predefined thresholds ensure that the received data satisfies a predefined criteria for spectral diversity.

A more complete understanding of the present invention, as well as further features and advantages of the present invention, will be obtained by reference to the following detailed description and drawings.

DETAILED DESCRIPTION

The present invention provides methods and apparatus for CDR and equalization update qualification. According to one aspect of the invention, pattern binning techniques are employed to detect the presence of bad pattern statistics. CDR and equalization updates are selectively enabled based on the detected pattern statistics. For example, the transition density of a Nyquist signal (1 T run length pattern), half Nyquist signal (2 T run length pattern) and quarter Nyquist signal (4 T run length pattern) can be detected using the disclosed pattern matching method. In the exemplary embodiment, the multi-tone pattern is comprised of 1 T, 2 T and 4 T run length patterns and the output of the pattern matching circuit is used to increment 1 T, 2 T, and 4 T tone counters. The 1 T, 2 T, and 4 T tone counters count the number of occurrences of the 1 T, 2 T, and 4 T run length patterns in a predefined window. Initially, the 1 T, 2 T, and 4 T tone counters are set to zero or another appropriate value. At the end of the window, a distribution of tones is evaluated. A well behaved pattern will generally distribute density among all its member tones. If a single tone becomes sufficiently prominent to exceed a preset threshold, the equalization or CDR updates (or both) are disabled.

Figure 1:
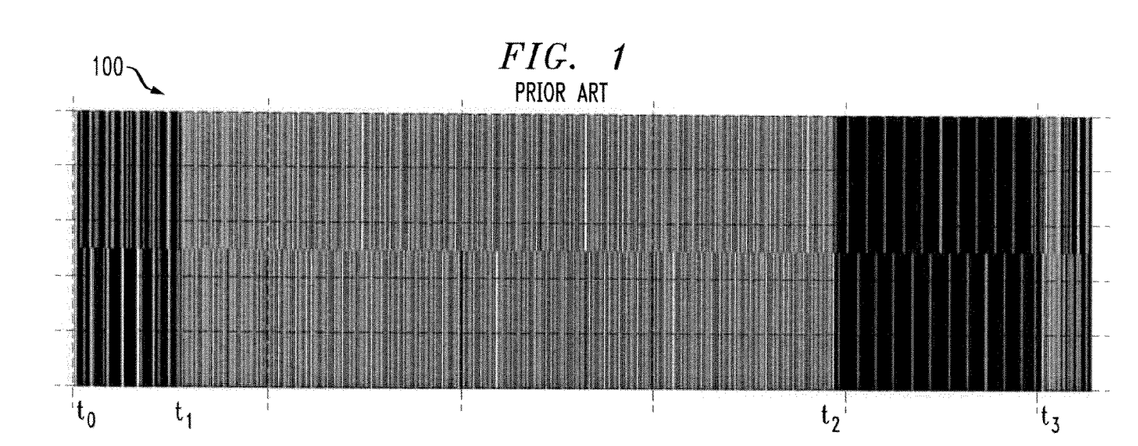
FIG. 1 illustrates an exemplary CJTPAT signal in binary form
Figure 2:
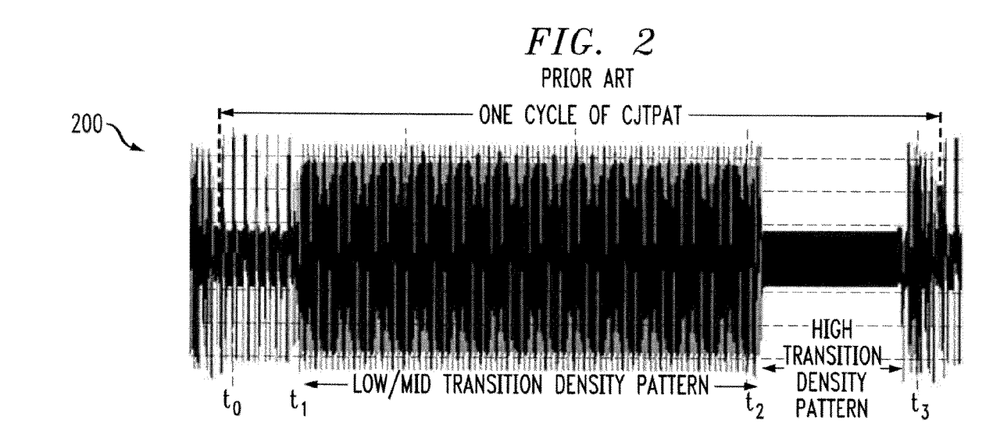
FIG. 2 illustrates an exemplary received version of the CJTPAT signal of FIG. 1 after transmission on a channel.

FIG. 1 illustrates an exemplary CJTPAT signal 100 in binary form. FIG. 2 illustrates an exemplary received version 200 of the CJTPAT signal 100 of FIG. 1 after transmission on a channel (not shown). As shown in FIG. 2, the CJTPAT signal consists of a repeating, mixed-frequency preamble from time $t_0$ to $t_1$, a continuous low-frequency signal from time $t_1$ to time $t_2$, and a continuous high-frequency signal from time $t_2$ to time $t_3$. It is noted that a PN7 multi-tone pattern or another multi-tone pattern could also be employed, as would be apparent to a person of ordinary skill in the art.

A communication channel typically exhibits a low pass effect on a transmitted signal. A low pass filter offers higher attenuation to high transition densities while it offers less attenuation to low transition densities, where higher transition density signals have a higher frequency component and lower transition density signals have a lower frequency component. The various transition density signal components of a signal will thus encounter different attenuation at the output of the channel, with higher frequency components of a transmitted signal being attenuated more than lower frequency components. Thus, the attenuation of a channel is said to be transition density dependent. As a result, the equalization parameters and clock recovery obtained for one transition density pattern will typically not be applicable for another transition density pattern.

As shown in FIG. 2, the received version 200 of the CJTPAT signal 100 does not have equal amplitude for all transition density (the input to the channel is a binary NRZ signal with equal amplitude). The high transition density signal from time $t_2$ to time $t_3$ attenuates severely while the low transition density signal from time $t_1$ to time $t_2$ does not attenuate at the same rate. Thus, there is an amplitude disparity at the channel output 200, while the input 100 to the channel had the same amplitude.

The present invention recognizes that the effect of the channel amplitude discrimination impacts equalization parameters and clock recovery parameters. This disparity results in excessive CDR jitter generation in the timing recovery path. In addition, this disparity drives the equalizer taps to suboptimal values (thereby resulting in lower output margin than could be obtained from a well behaved receiver). The jitter generation problem and lower output margin problem of the receiver can be eliminated if such pattern density disparities could be detected.

Thus, according to one aspect of the present invention, channel amplitude discrimination is detected through bit pattern history binning. As discussed hereinafter, when binning disparity is increased between high density and lower density bits, equalization and CDR updates are suspended.

The CJTPAT signal 100 is comprised of a number of various run length patterns. A 1 T pattern has a run length of 1, such as 101010; a 2 T pattern has a run length of 2, such as 11001100 and a 4 T pattern has a run length of 4, such as 1111000011110000. It is noted that a 1 T pattern is the highest density transition pattern and the 4 T pattern is the lowest density transition pattern in the exemplary embodiment. Generally, the present invention recognizes that the dominance of a particular pattern density is not desirable for CDR or equalization update.

Figure 3:
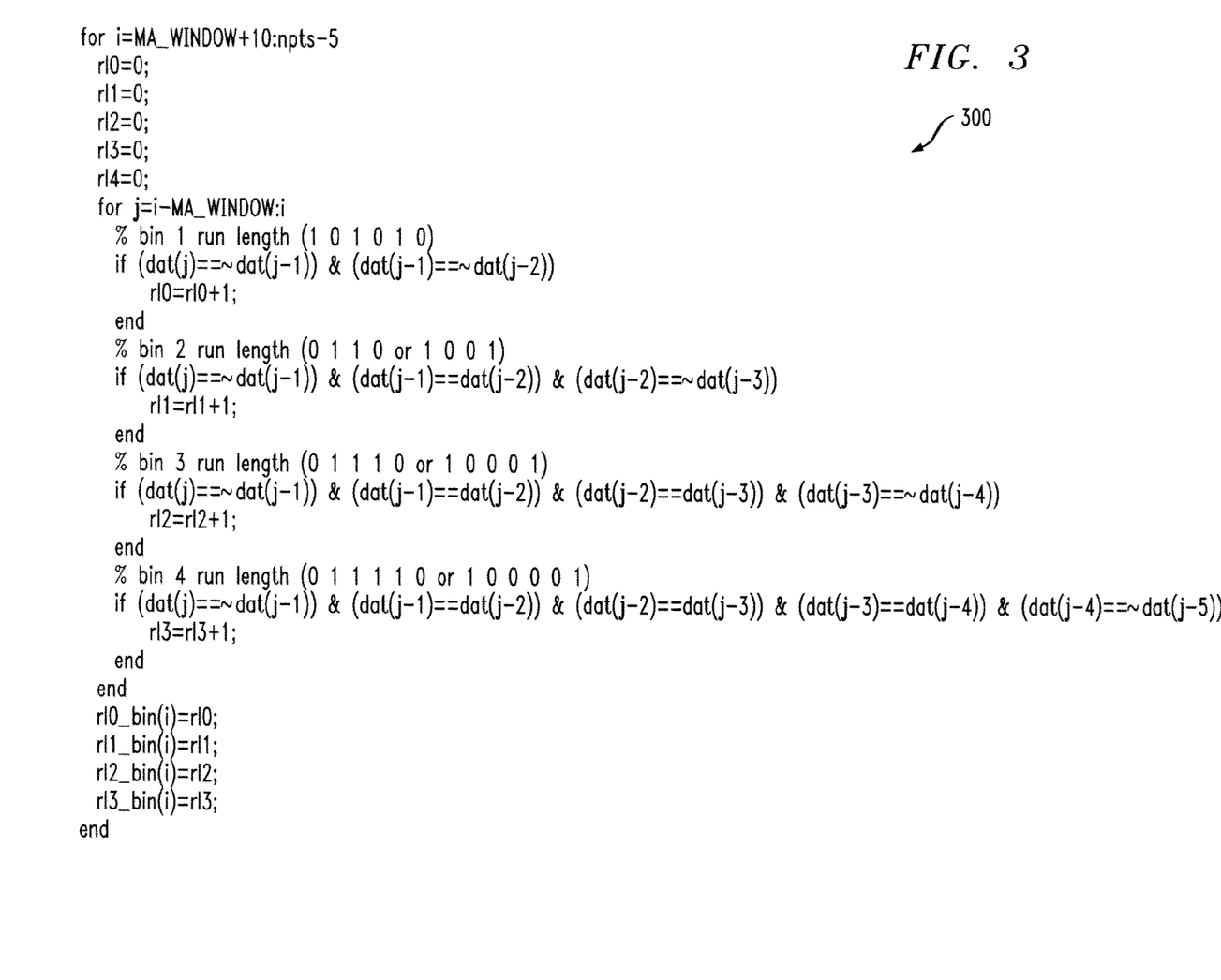
FIG. 3 illustrates exemplary pseudo code for an exemplary pattern density binning circuit incorporating features of the present invention.

A binning technique is employed to determine the number of each run length pattern in the CJTPAT multi tone pattern 100. FIG. 3 illustrates exemplary pseudo code 300 for an exemplary pattern density binning circuit. The exemplary pattern density binning circuit provides a moving average filter to bin the transition densities within a measurement window.

Figure 4:
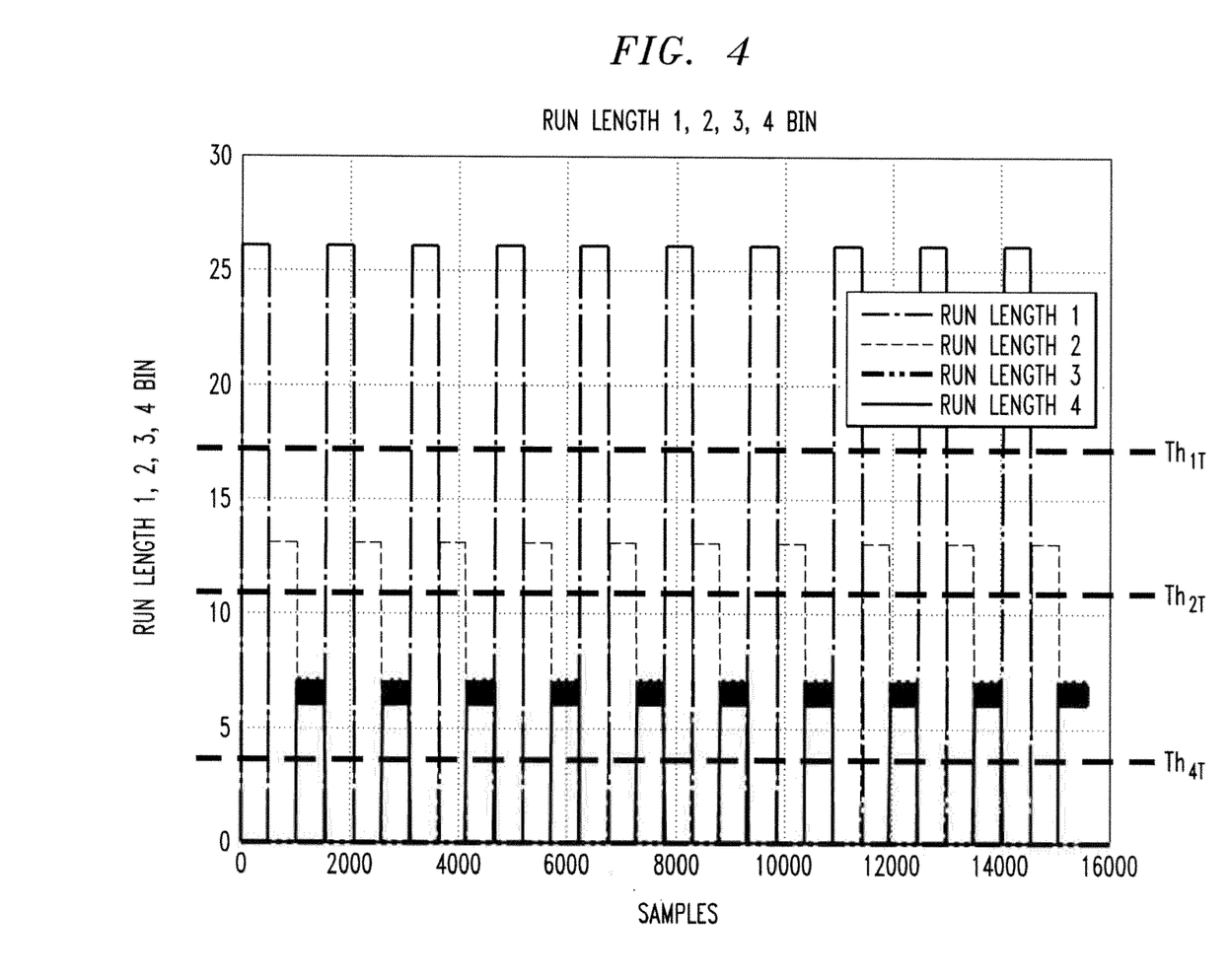
FIG. 4 illustrates the relative frequency and amplitude of various run length patterns that comprise the CJTPAT multi tone pattern in a given moving average window.

FIG. 4 illustrates the relative frequency and amplitude of various run length patterns that comprise the multi tone pattern 100 that comprise a block of 1 T patterns, followed by 2 T and 4 T patterns in sequence in a given moving average window. The bin output follows the pattern cycle. As shown in FIG. 3, a 1 T pattern will occur twice as often as a 2 T pattern, a 2 T pattern will occur twice as often as a 4 T pattern. In addition, a 1 T transition pattern threshold, $Th_{1\,T}$ (also referred to as the Update Discard Threshold for 1 T pattern), is twice as large as the 2 T transition threshold, $Th_{2\,T}$, and the 2 T transition pattern threshold is twice as large as the 4 T transition threshold, $Th_{4\,T}$.

In each pattern cycle, the bin for the corresponding transition density reaches the maximum value that exceeds their preset threshold value, $Th_{1\,T}$, $Th_{2\,T}$, $Th_{4\,T}$. Thus, the binning method provides an accurate indication of the presence of certain tones in the input to the receiver. From each of the run length binning, the CDR and equalization updates can be disabled because they all exceed the threshold.

Figure 5:
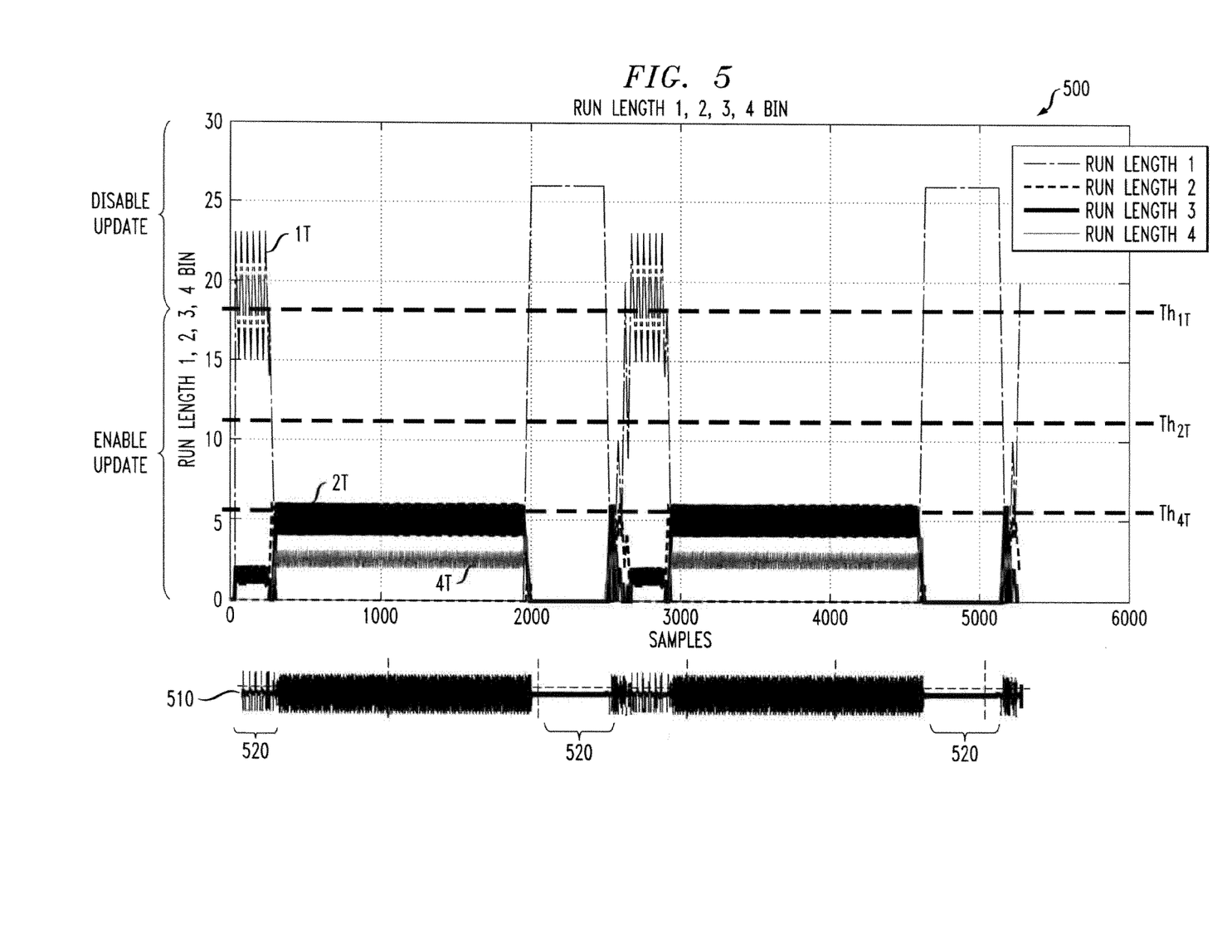
FIG. 5 illustrates a pattern binning threshold for the exemplary CJTPAT signal in further detail.

FIG. 5 illustrates a pattern binning threshold for the exemplary CJTPAT signal 100 in further detail. FIG. 5 shows the transition binning values versus sample. Each trace corresponds to binning data for a given run length (1 T, 2 T, and 4 T). In addition, the CJTPAT bit pattern output 510 at the output to the channel is also shown.

As shown in FIG. 5, the CJTPAT pattern 100 experiences the most attenuation for a 1 T pattern (1010) as shown in intervals 520. It is noted that during intervals other than the intervals 520 there is generally a homogeneous mix of 1 T, 2 T, and 4 T patterns. In other words, the binning traces peak during the 1 T run length pattern intervals 520 and all other binning (2 T and 4 T run length traces) are substantially zero. In one preferred embodiment, summation of all bin values will approach the maximum window size. Thus, by setting an update threshold ($Th_{1\,T}$, $Th_{2\,T}$, $Th_{4\,T}$) for each run length, the present invention can selectively enable updates in CDR and equalization. As discussed further below, if one or more bins exceed the corresponding threshold, all CDR and equalization updates are disabled. When the bin values are above the threshold, CDR and equalization updates are enabled.

Figure 6:
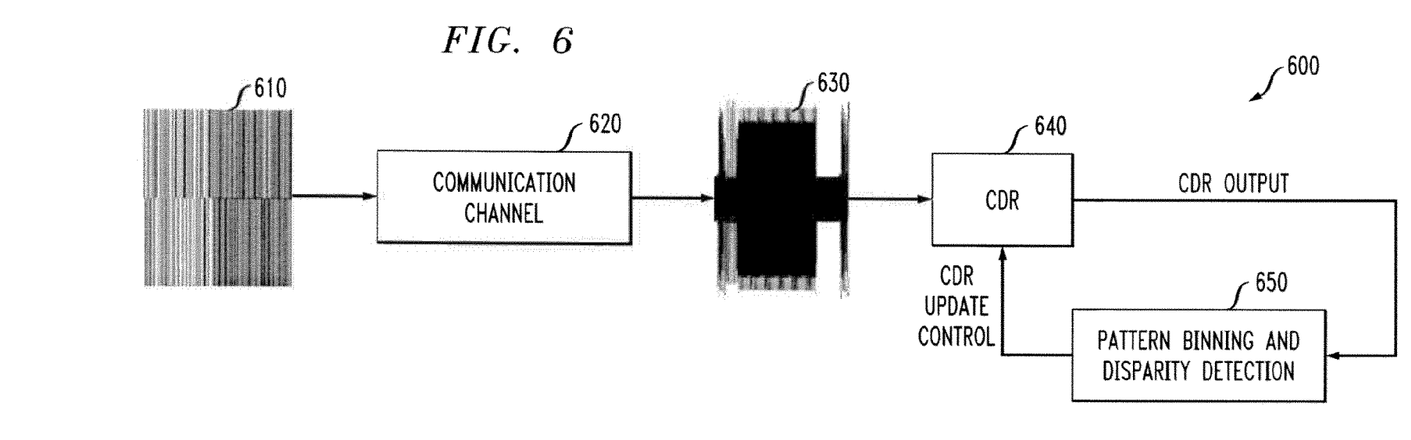
FIG. 6 is a schematic block diagram of an exemplary CDR update system incorporating features of the present invention.

FIG. 6 is a schematic block diagram of an exemplary CDR update system 600 incorporating features of the present invention. As shown in FIG. 6, the exemplary CDR update system 600 comprises a communication channel 620 that receives a multitone pattern 610, such as a CJTPAT pattern 100, at its input and provides a received version 630 of the CJTPAT pattern at its output. The received signal 630 is processed by a CDR block 640 in a known manner. The output of the CDR 640 is applied to a pattern binning and disparity detection block 650, which generates a CDR update control signal that selectively enables the CDR block 640. Generally, the pattern binning and disparity detection block 650 may be enabled as discussed further below in conjunction with FIGS. 8 and 9.

Figure 7:
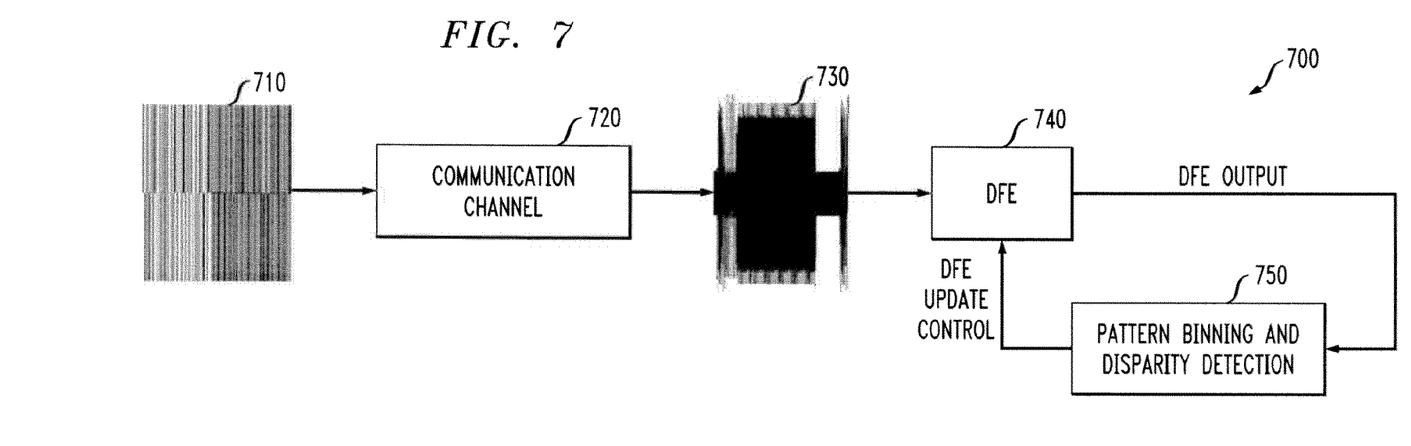
FIG. 7 is a schematic block diagram of an exemplary DFE update system incorporating features of the present invention.

FIG. 7 is a schematic block diagram of an exemplary DFE update system 700 incorporating features of the present invention. As shown in FIG. 7, the exemplary DFE update system 700 comprises a communication channel 720 that receives a multitone pattern 710, such as a CJT pattern 100, at its input and provides a received version 730 of the CJTPAT pattern at its output. The received signal 730 is processed by a DFE block 740 in a known manner. The output of the CDR 740 is applied to a pattern binning and disparity detection block 750, which generates a DFE update control signal that selectively enables the DFE block 740. Generally, the pattern binning and disparity detection block 750 may be enabled as discussed further below in conjunction with FIGS. 8 and 9.

Figure 8:
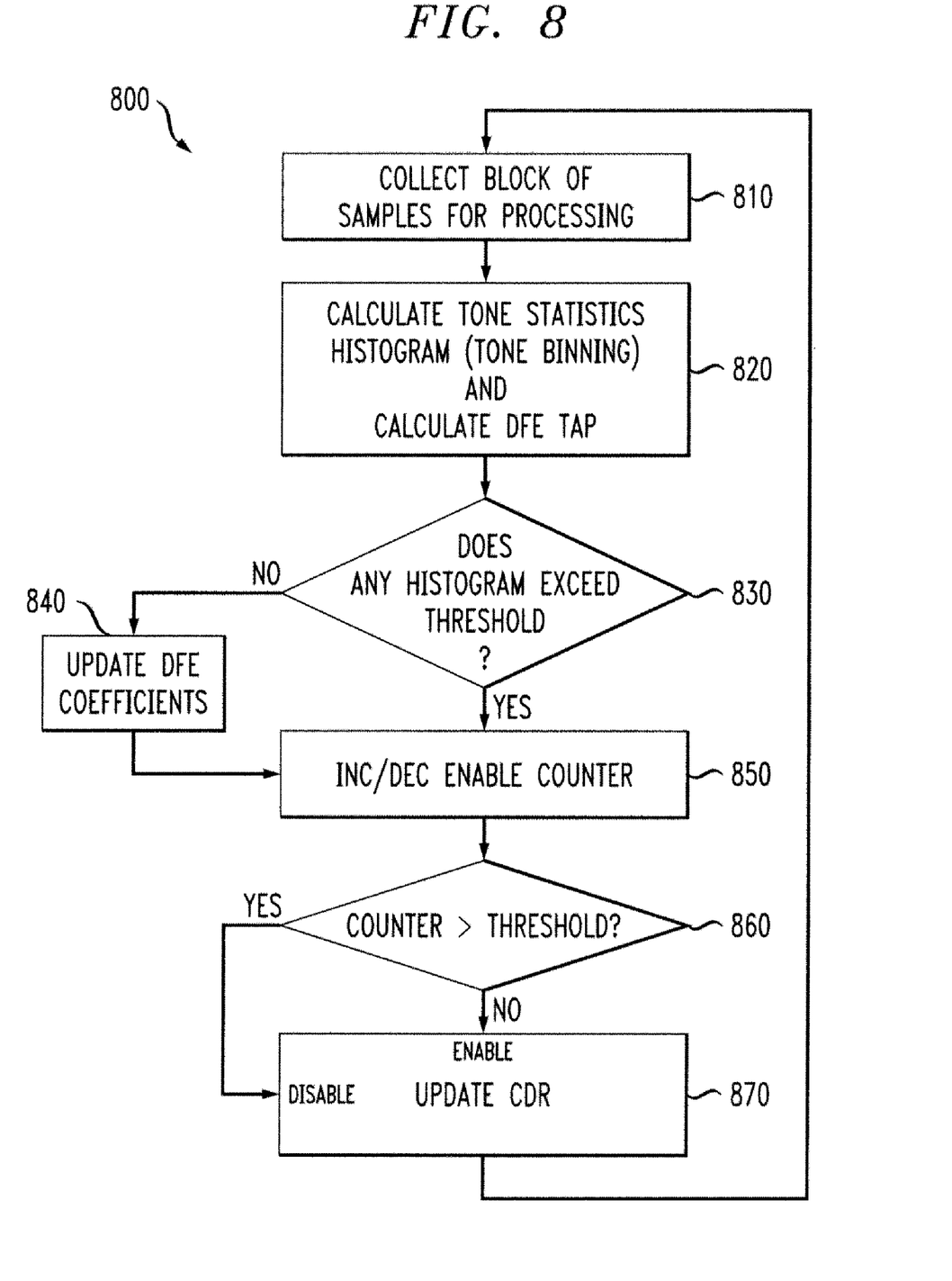
FIG. 8 is a flow chart describing an exemplary implementation of a CDR/DFE Update Qualification process incorporating features of the present invention.

FIG. 8 is a flow chart describing an exemplary implementation of a CDR DFE Update Qualification process 800 incorporating features of the present invention. As shown in FIG. 8, the process 800 initially captures a block of data samples and transition data during step 810. The captured data is analyzed during step 820 through a tone pattern matching unit. For example, the tone pattern detection of step 820 can detect and count the appearances of a 1 T pattern (1010), a 2 T pattern (11001100), and a 4 T pattern (1111000011110000).

If it is determined during step 830 that the pattern counts do not exceed a corresponding preset threshold ($Th_{1\,T}, Th_{2\,T}, Th_{4\,T}$), the DFE tap coefficients associated with that block of data are updated during step 840 and program control proceeds to step 850, where a counter is adjusted as indicated below. If, however, it is determined during step 830 that any of the pattern count exceeds the corresponding preset threshold ($Th_{1\,T}, Th_{2\,T}, Th_{4\,T}$), the DFE tap coefficients associated with that block of data are not updated and program control proceeds to step 850, where a counter is adjusted as indicated below. If any bin threshold is exceeded, the counter is incremented during step 850. If the bin counter thresholds are not exceeded, the counter is decremented during step 850.

A test is performed during step 860 to determine if the counter exceeds another preset threshold. If the counter does not exceed the second preset threshold, the CDR update is enabled during step 870. If, however, the counter does exceed the second preset threshold, the CDR update is disabled during step 870.

Figure 9:
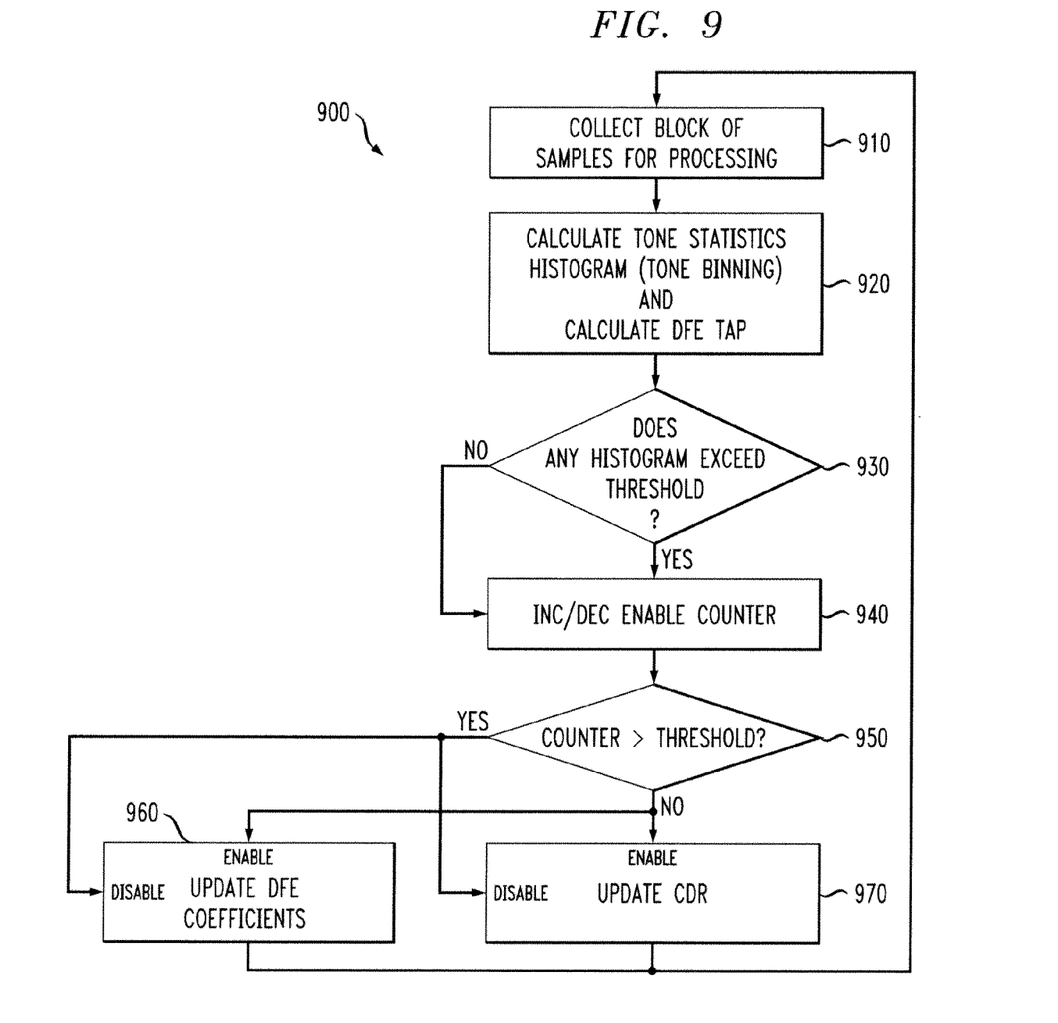
FIG. 9 is a flow chart describing an exemplary implementation of an alternate CDR/DFE Update Qualification process incorporating features of the present invention.

FIG. 9 is a flow chart describing an exemplary implementation of an alternate CDR/DFE Update Qualification process 900 incorporating features of the present invention. As shown in FIG. 9, the process 900 initially captures a block of data samples and transition data during step 910. The captured data is analyzed during step 920 through a tone pattern matching unit. For example, the tone pattern detection of step 920 can detect and count the appearances of a 1 T pattern (1010), a 2 T pattern (11001100), and a 4 T pattern (1111000011110000).

If it is determined during step 930 that the pattern counts do not exceed a corresponding preset threshold ($Th_{1\,T}, Th_{2\,T}, Th_{4\,T}$), program control proceeds to step 940 where the counter is decremented. If, however, it is determined during step 930 that one or more pattern counts exceed a corresponding preset threshold ($Th_{1\,T}, Th_{2\,T}, Th_{4\,T}$), program control proceeds to step 940, where the counter is incremented. Thus, if any bin threshold is exceeded, the counter is incremented during step 940. If the bin counter thresholds are not exceeded, the counter is decremented during step 940.

A test is performed during step 950 to determine if the counter exceeds a preset counter threshold. If the counter does not exceed the preset counter threshold, the CDR and equalization updates are enabled during steps 960 and 970. If, however, the counter exceeds the preset counter threshold, the CDR and equalization updates are disabled during steps 960 and 970.

Conclusion

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. A method for timing recovery, comprising:
   obtaining a block of received data, said received data comprising a plurality of multiple tone patterns;
   calculating tone statistics of one or more of said multiple tone patterns; and
   selectively disabling an update of said timing recovery from said received data if one or more of said multiple tone patterns exceed a corresponding predefined threshold.

2. The method of claim 1, wherein said tone statistics are obtained by counting one or more of said multiple tone patterns.

3. The method of claim 2, wherein said count is obtained using a tone pattern matching technique.

4. The method of claim 1, wherein said multiple tone patterns comprise one or more of a 1 T run length pattern, a 2 T run length pattern and a 4 T run length pattern.

5. The method of claim 1, wherein said corresponding predefined thresholds ensure that said received data satisfy a predefined criteria for spectral diversity.

6. An equalization adaptation method, comprising:
   obtaining a block of received data, said received data comprising a plurality of multiple tone patterns;
   calculating tone statistics of one or more of said multiple tone patterns; and
   selectively disabling said equalization adaptation if one or more of said multiple tone patterns exceed a corresponding predefined threshold.

7. The method of claim 6, wherein said tone statistics are obtained by counting one or more of said multiple tone patterns.

8. The method of claim 7, wherein said count is obtained using a tone pattern matching technique.

9. The method of claim 6, wherein said multiple tone patterns comprise one or more of a 1 T run length pattern, a 2 T run length pattern and a 4 T run length pattern.

10. The method of claim 6, wherein said corresponding predefined thresholds ensure that said received data satisfy a predefined criteria for spectral diversity.

11. A timing recovery system, comprising:
    a memory; and
    at least one processor, coupled to the memory, operative to:
    obtain a block of received data, said received data comprising a plurality of multiple tone patterns;
    calculate tone statistics of one or more of said multiple tone patterns; and selectively disable an update of said timing recovery from said received data if one or more of said multiple tone patterns exceed a corresponding predefined threshold.

12. The timing recovery system of claim 11, wherein said processor is further configured to obtain said tone statistics by counting one or more of said multiple tone patterns.

13. The timing recovery system of claim 12, wherein said count is obtained using a tone pattern matching technique.

14. The timing recovery system of claim 11, wherein said multiple tone patterns comprise one or more of a 1 T run length pattern, a 2 T run length pattern and a 4 T run length pattern.

15. The timing recovery system of claim 11, wherein said corresponding predefined thresholds ensure that said received data satisfies a predefined criteria for spectral diversity.

16. An equalization adaptation system, comprising:
a memory; and
at least one processor, coupled to the memory, operative to:
obtain a block of received data, said received data comprising a plurality of multiple tone patterns;
calculate tone statistics of one or more of said multiple tone patterns; and
selectively disable said equalization adaptation if one or more of said multiple tone patterns exceed a corresponding predefined threshold.

17. The equalization adaptation system of claim 16, wherein said processor is further configured to obtain said tone statistics by counting one or more of said multiple tone patterns.

18. The equalization adaptation system of claim 17, wherein said count is obtained using a tone pattern matching technique.

19. The equalization adaptation system of claim 16, wherein said multiple tone patterns comprise one or more of a 1 T run length pattern, a 2 T run length pattern and a 4 T run length pattern.

20. The equalization adaptation system of claim 16, wherein said corresponding predefined thresholds ensure that said received data satisfy a predefined criteria for spectral diversity.

* * * * *